United States Patent [19]

Rossi

[11] Patent Number: 5,587,924
[45] Date of Patent: Dec. 24, 1996

[54] AUTOMATIC SYSTEM FOR HANDLING BATTERIES

[75] Inventor: Markku J. Rossi, Houston, Tex.

[73] Assignee: Compaq Computer Corporation, Houston, Tex.

[21] Appl. No.: 414,760

[22] Filed: Mar. 31, 1995

[51] Int. Cl.⁶ ................................................ H02J 7/00
[52] U.S. Cl. ........................... 364/496; 340/636; 320/2
[58] Field of Search ................................ 364/496, 403, 364/550, 492 C; 340/636; 320/2

[56] References Cited

U.S. PATENT DOCUMENTS

| | | | |
|---|---|---|---|
| 4,006,396 | 2/1977 | Bogut | 320/2 |
| 4,628,243 | 12/1986 | Hodgman et al. | 320/2 |
| 4,737,702 | 4/1988 | Koenck | 320/40 |
| 4,817,154 | 3/1989 | Hoyer | 381/36 |
| 4,820,966 | 4/1989 | Fridman | 320/32 |
| 4,965,738 | 10/1990 | Bauer et al. | 364/483 |
| 5,111,128 | 5/1992 | Branan, Jr. et al. | 320/2 |
| 5,117,173 | 5/1992 | Oliva et al. | 320/21 |
| 5,162,721 | 11/1992 | Sato | 320/15 |
| 5,184,059 | 2/1993 | Patino et al. | 320/15 |
| 5,200,686 | 4/1993 | Lee | 320/2 |
| 5,237,257 | 8/1993 | Johnson et al. | 320/2 |
| 5,274,319 | 12/1993 | Keener et al. | 320/2 |
| 5,278,487 | 1/1994 | Koenck | 320/21 |
| 5,280,231 | 1/1994 | Kato et al. | 320/31 |

OTHER PUBLICATIONS

Drexler, R. G. et al. "Notch Filter Instrument for Measuring ELF(Extremely Low Frequency) MSK (Minimum Shift Keying) Signal (Technical rept.)" Abstract only; IIT Research Inst., Chicago, IL Jan. 1988.

*Primary Examiner*—Emanuel T. Voeltz
*Assistant Examiner*—Kamini Shah
*Attorney, Agent, or Firm*—Jenkens & Gilchrist P.C.

[57] ABSTRACT

The present invention is related to a battery type determination circuit having a notch filter circuit which notches a frequency noise spectrum to indicate a battery type installed in a battery pack. More specifically, the preferred embodiment of the present invention can determine a variety of battery characteristics based on the notched frequency and look-up information stored in a memory chip.

22 Claims, 4 Drawing Sheets

FIG. 5B
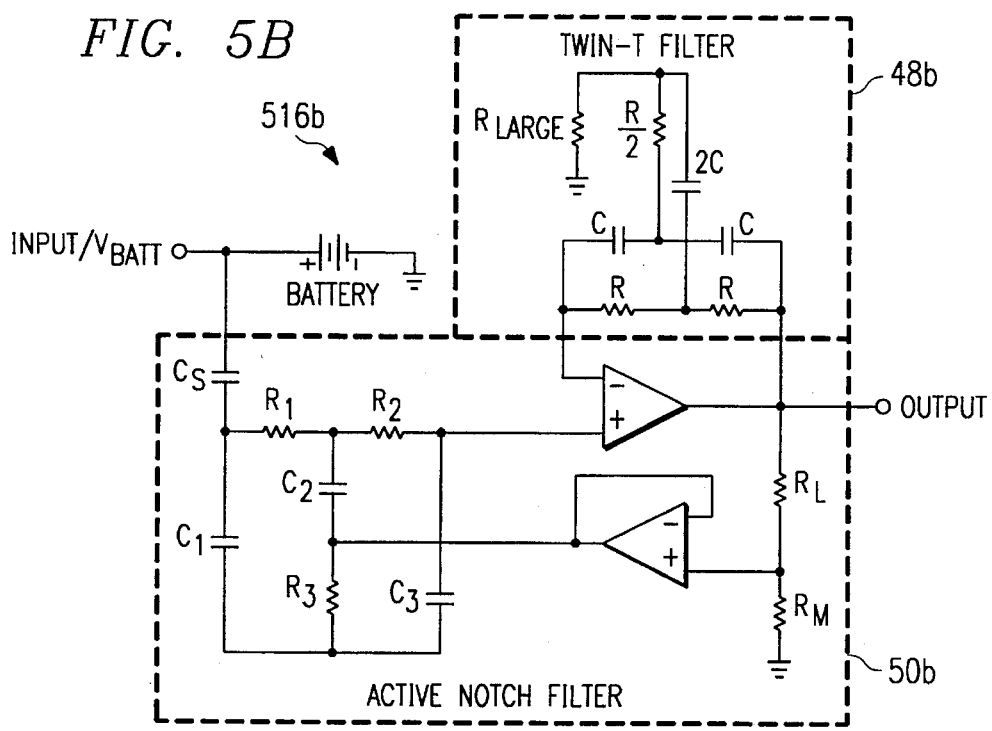
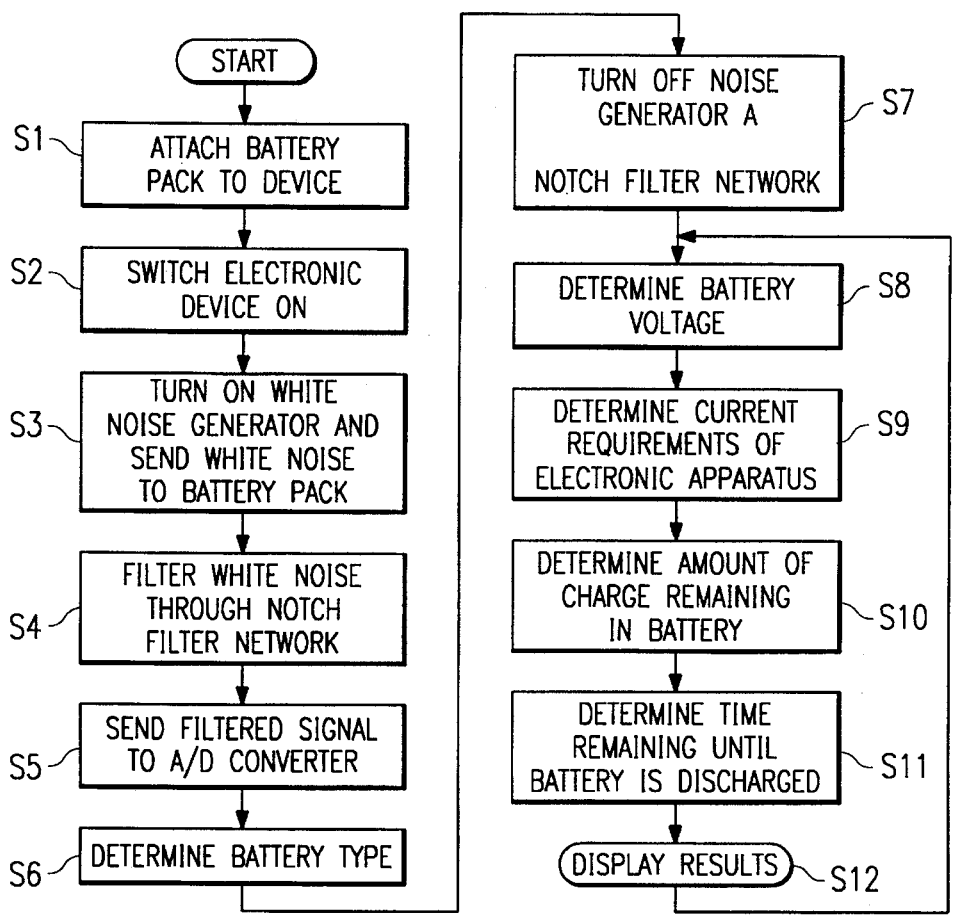
FIG. 6

AUTOMATIC SYSTEM FOR HANDLING BATTERIES

BACKGROUND OF THE INVENTION

1. Field of the Invention

This invention relates to a method and apparatus for determining the "remaining energy capacity versus voltage" curve of a battery while installed in an apparatus. More specifically, this invention relates a method and apparatus for determining a battery type, chemical composition, voltage level, current use, and remaining battery power of a battery while it is installed and in use in an electronic apparatus.

2. Description of the Related Art

Ever since batteries were invented, determining exactly how much longer a battery will last before a replacement battery is necessary has been difficult. Many devices and techniques have been used to determine the energy remaining in a battery. For example, there have been devices that measure the voltage across a battery while it is in service thereby providing a user with a voltage read-out. This type of system is ok, but batteries tend to hold a voltage while they are in use and then exponentially drop their output voltage just prior to the battery's total energy discharge. Thus, the user has very little warning before a battery goes dead.

Other systems mechanically code batteries so that the battery type is read when the battery is installed into an apparatus. Once the battery type is known then a remaining charge v. voltage curve can be determined for the specific battery type. The coding consists of metal bands about the battery which complete circuits when the battery is installed into a device. Depending on what circuits are completed when the battery is installed, the apparatus can determine whether the battery is a nicadmium, lithium, acid, alkaline, and/or determine the battery voltage output curve based on the battery type. Other techniques for coding a battery have included installing digital circuits into the battery pack to provide a digital output when the battery is installed, installing magnetic strips into a battery pack, installing light reflective surfaces which encode a battery type.

SUMMARY OF THE INVENTION

The present invention is a system for determining a battery's energy capacity while the battery is in use in an electronic device. Capacitors and resistors are configured in a battery pack to create a cascaded notch filter circuit. The notch filter circuit can be an active or passive filter circuit or a combination active and passive circuit. When the battery pack is connected to an electronic device, a white noise generator provides a signal to the notch filter. The output of the notch filter is a notched signal which indicates the type of battery in stalled in the battery pack.

This system is small and inexpensive to install in a battery pack. The notch locations in the frequency band can be physically set by a manufacturer by adjusting capacitor and resistor values. The system further requires a minimum number of connections between the battery pack and an electronic device.

BRIEF DESCRIPTION OF THE DRAWINGS

The advantages of this invention will become more apparent and more lo readily appreciated from the following description of the presently preferred exemplary embodiments, taken in conjunction with the accompanying drawings, of which:

FIG. 5b is a circuit diagram of an exemplary dual-notch, notch filter in accordance with an exemplary embodiment of the present invention; and FIG. 6 is a flow chart of a preferred operation of a preferred exemplary embodiment.

DETAILED DESCRIPTION OF THE PREFERRED EMBODIMENTS OF THE PRESENT INVENTION

Battery packs have been manufactured in a wide variety of shapes and sizes since batteries were first invented. It has become customary for an electronic device to have a battery within a standardized battery pack. The battery pack powers the electronic device. Manufacturers have also established a practice of installing different types of batteries into the standardized battery packs. The different types of batteries include lead acid, alkaline, nicadmium, lithium, etc. batteries. Furthermore, the batteries can be, for example, lithium-ion batteries, but have different chemical compositions depending on when the battery was manufactured.

Figure 1:
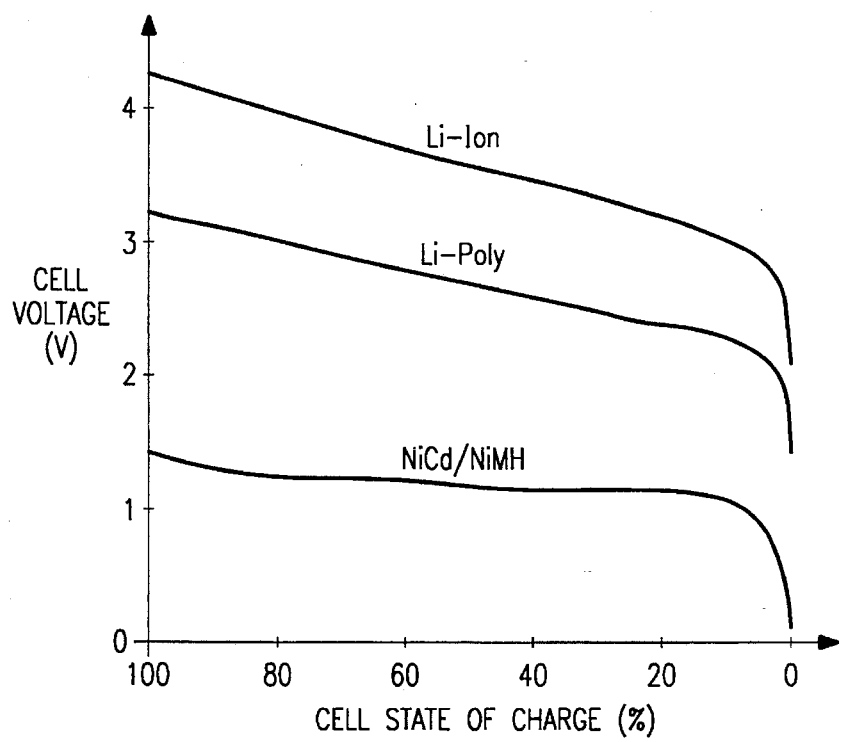
FIG. 1 is graph depicting battery cell voltage versus the present charge remaining in the battery's cell, based on battery type/chemical composition.

Different types of batteries and similar batteries having different chemical compositions each have different battery charge curves. A battery charge curve represents how much charge a battery cell maintains when a percentage of a battery cell's total capacity has been expended. FIG. 1 depicts the charge curves for lithium-ion, lithium-poly, and nicadmium batteries. Each battery type depicted has a different distinct charge curve.

The preferred embodiments of the present invention enable an electronic device to determine the type of battery in a battery pack. The preferred embodiments can also determine the amount of time remaining before the battery is discharged based on the present battery load.

Figure 2:
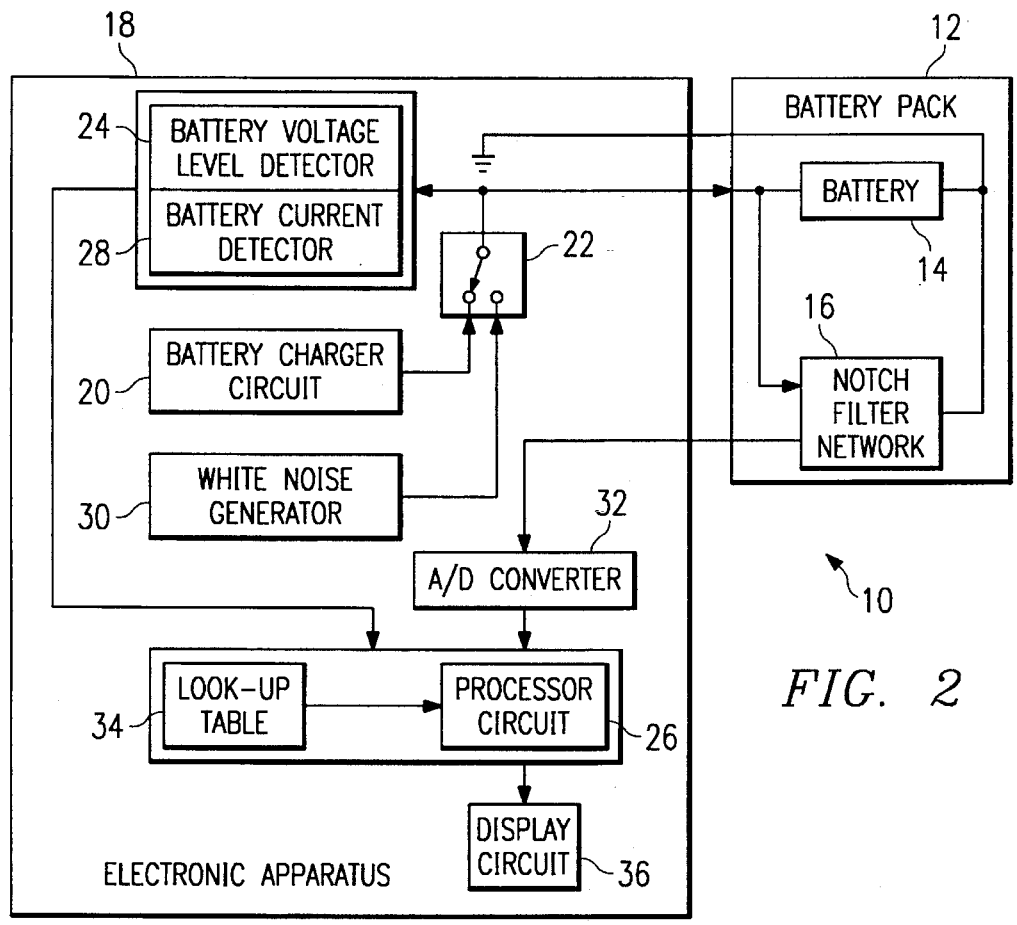
FIG. 2 is a block circuit diagram of a first exemplary embodiment of the preferred battery management system.

FIG. 2 depicts a first preferred exemplary embodiment of the present battery managing system 10. The present embodiment can exist in almost any battery powered electronic device 18. The inventor envisions the battery management system 10 being incorporated into a personal digital assistant (PDA), a portable computer, mobile telephone, portable video camera or any other battery operated device wherein a user would be interested in the remaining amount of charge and/or time remaining until the batteries are discharged.

FIG. 2 depicts a battery pack 12. The battery pack 12 includes a battery 14. The battery 14 can be a lithium-ion, lithium-poly, nicadmium, alkaline or any other similar battery. The battery pack 12 also includes a filter circuit 16, preferably a multiple stage notch filter circuit. The notch filter 16 preferably comprises capacitors, resistors and operational amplifiers (op-amps).

The notch filter circuit 16 contains elements to notch specific frequency bands when white noise is passed through the filter 16. The frequency notches are representative of a cede which indicates the battery type installed in the battery pack 12. The filter network 16 can be made from surface mounted components which are very small. Furthermore, the simple resistor, capacitor and op-amp circuit required is very inexpensive to manufacture.

The notches of the notch filter 16 are preset by selecting appropriate capacitors and resistors. Thus, battery pack manufacturers can standardize notches to define specific battery types, configurations, chemical composition, charge curves, etc. The battery pack 12 is connected or attached to the electronic device 18 in a usual way.

Within the electronic device 18 is a battery charger circuit 20. The battery charger circuit 20 is used to charge the battery 14 if so desired. The battery charger circuit 20 is optional in the preferred exemplary embodiment. When the battery 14 is to be charged, the switch 22 can be set so that the battery charging circuit 20 is connected to the battery 14 within the battery pack 12. The switch 22 can be a reed relay, mechanical switch, transistor switch, digital integrated circuit, programmable switch or any substantially similar device that can handle the charging current of the charging circuit.

The electronic device 18 can also contain a battery voltage level detection circuit 24. The battery voltage level detection circuit 24 detects the voltage across the battery terminals while the battery pack 12 is connected to the electronic apparatus 18. The voltage level is digitized and delivered to a processor circuit 26 as described below.

The electronic device may also include a battery current detector 28 which detects the instantaneous current flow from the battery 14. The current level is digitized and delivered to a processor circuit 26 as explained below.

The electronic device of the preferred exemplary embodiment includes a white noise generator 30. The white noise generator 30 is switched via the switch 22 to provide white noise to the battery pack 12. The white noise is connected to the notch filter 16 circuitry within the battery pack 12. The white noise generator 30 preferably has a white noise band width from about 100 HZ to about 70 KHZ, but can be almost any predetermined range depending on the number of notches required and the notch filter 16 incorporated into the battery pack 12.

The notch filter network 16 turns on in the presence of the white noise (circuitry not shown) and filters the noise signal by placing notches in the frequency band at predetermined places. The notches in the frequency band identify the type of battery 14 present in the battery pack 12. The output signal (the notched pass band signal) from the notch filter network 16 is passed back to the electronic apparatus and received by an analog to digital converter circuit (A/D converter) 32. The A/D converter 32 converts the notch filter output signal to a digital signal which is received by a processing circuit 26. This process can be achieved by performing a fast forier transform. By sliding the sampling frequency, a necessary resolution in the frequency domain can be achieved.

The processing circuit 26 of the preferred exemplary embodiment comprises a microprocessor or microcontroller with an on board read-only-memory (ROM). It is understood that the ROM can be separate from the processor circuit 26. The ROM is used to store a look-up table 34 of different battery types. The processing circuit 26 receives the digital signal from the A/D converter 32 and retrieves battery type information from the look-up table 34 based on the digital signal.

It is understood that the processor circuit 26 does not need to be a microprocessor or microcontroller. It can be a more specialized circuit like an application specific integrated circuit.

The processing circuit 26 uses the battery type information in conjunction with voltage information received from the battery voltage level detector circuit 24 to determine where on a battery charge curve the battery's power level is. The determined battery charge level is displayed on a display via the display circuitry 36. The display circuitry 36 can be a variety of circuits in the preferred exemplary embodiment. The display circuit 36 can include a bar graph, digital numeral output device, voltage meter, etc. Furthermore, the determined battery voltage charge level for the particular battery type can be combined with present "current use" information provided by the battery current detector 28. The processor circuit 26 calculates the amount of time before the installed battery's charge is too low to be useful based on the present current use of the electrical apparatus. The time remaining until the battery 14 is discharged can also be displayed by the display circuit 36 in any one of a variety of ways known to someone of ordinary skill in the art.

Thus, the inexpensive notch filter network 16 built into the battery pack 12 supplies an identification means a signal which enables the electronic device 18 to determine the type of battery 14 is in the battery pack 12, which in turn, enables the user to read on a display 36 the amount of charge left in the battery 14 and the expected useful life (time) remaining in the battery 14 based on present current usage of the electronic device 18.

The first preferred exemplary embodiment has a minimal number of electrical connections between the battery pack 12 and the electronic apparatus 18. The connections being 1) ground; 2) power/white noise; and 3) notch filter network output.

Figure 3:
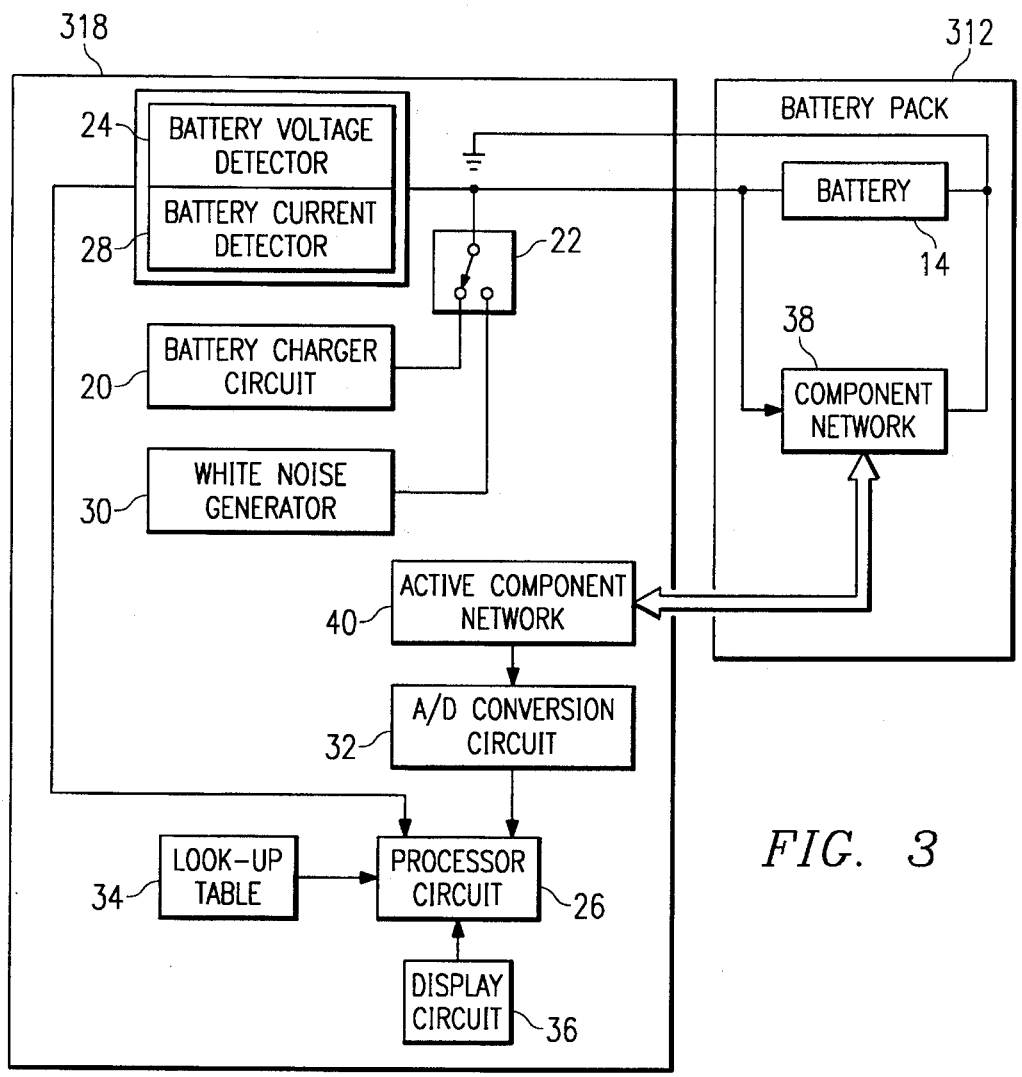
FIG. 3 is a block circuit diagram of a second exemplary embodiment of the preferred exemplary battery management system.

A second exemplary embodiment of the present battery management system 310 is depicted in FIG. 3. The main difference between the first and the second embodiments of the preferred exemplary battery management systems is that the battery pack 312 contains a component network 38 rather than a complete active notch filter circuit 16. Thus, only capacitors, resistors and inductors are necessary in the component network 38. Preferably, only resistors and capacitors are used in the component network 38.

The component network 38 is connected, via a few electrical connections, from the battery pack 312 to the electronic device 318 so that the active component network 40 is connected to the component network 38, thereby establishing a filter circuit. Preferably, the filter circuit is a notch filter. The remaining portions of the second exemplary embodiment are very similar to the first exemplary embodiment.

Figure 4:
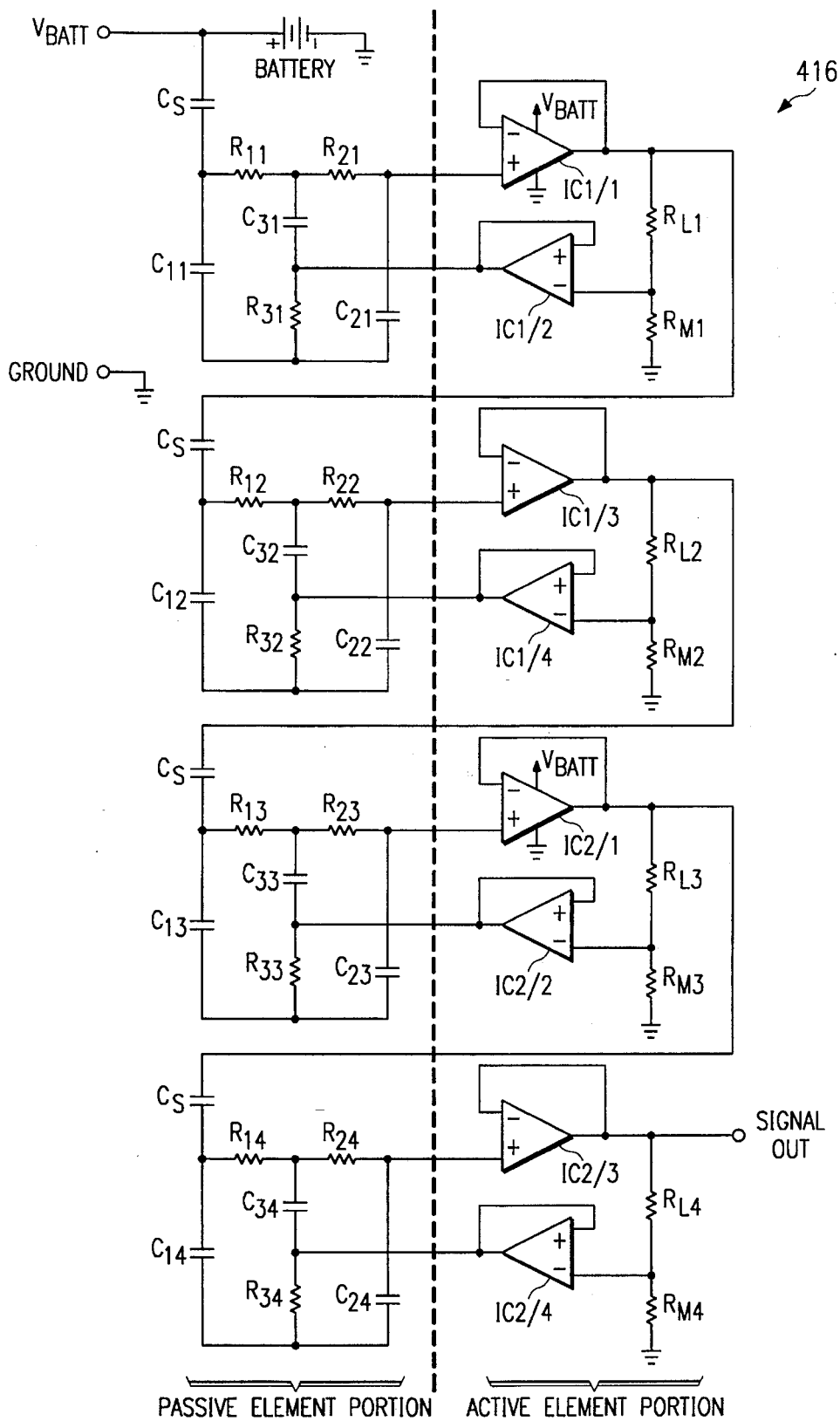
FIG. 4 is a circuit diagram of an active cascaded notch filter network according to an exemplary embodiment of the present invention.

FIG. 4 depicts a preferred exemplary notch filter network 416 for use in either the first or second embodiments of the preferred exemplary embodiments depicted in FIGS. 2 and 3. FIG. 4 also depicts a division between the active portion 40 of the circuit and the passive portion 38 of the circuit. The division indicates the passive circuit portion 38 that is in the battery pack 3 12 and the active portion 40 that is in the electronic device.

The exemplary notch filter 416 is a cascaded notch filter which produces four notches in the pass band of the total filter. The four notches can be interpreted as a binary signal four bits wide within an A/D converter 32. Thus, the exemplary notch filter 416 has the capability of encoding 256 different battery types.

The notch filter 416 has resistor and capacitor networks which connect in lattice networks to establish each stage of the notch filter network. The lattice networks are connected to op-amps thereby completing each cascaded, active notch filter. As mentioned above, the notch filter 416 can be coded to supply an identification for a battery type or a battery composition by selecting appropriate capacitors and resistors in the lattice.

Using an example of a lithium-ion battery, wherein the battery could be manufactured having various battery compositions, each producing different battery energy curves, the following is an example of how to set the resistors and capacitors in the four stages of the notch filter 416 depicted in FIG. 4.

An example of the coding of discharge curve points:

| Battery Voltage | Notch Frequency | R11, R21 | R31 | C11, C21 | C31 |
|---|---|---|---|---|---|
| 5% energy point | | | | | |
| 2.8 | 50 k | 680 | 330 | 4.7 n | 10 n |
| 2.9 | 41 k | 820 | 390 | 4.7 n | 10 n |
| 3.0 | 34 k | 1000 | 470 | 4.7 n | 10 n |
| 3.1 | 28 k | 1200 | 560 | 4.7 n | 10 n |
| 3.2 | 23 k | 1500 | 680 | 4.7 n | 10 n |

| Battery Voltage | Notch Frequency | R12, R22 | R32 | C12, C22 | C32 |
|---|---|---|---|---|---|
| 30% energy point | | | | | |
| 2.9 | 16 k | 1000 | 470 | 10 n | 22 n |
| 3.1 | 13 k | 1200 | 560 | 10 n | 22 n |
| 3.3 | 11 k | 1500 | 680 | 10 n | 22 n |
| 3.5 | 7 k | 2200 | 1000 | 10 n | 22 n |
| 3.7 | 5 k | 3300 | 1500 | 10 n | 22 n |

| Battery Voltage | Notch Frequency | R13, R23 | R33 | C13, C23 | C33 |
|---|---|---|---|---|---|
| 80% energy point | | | | | |
| 3.5 | 3 k | 2200 | 1000 | 22 n | 47 n |
| 3.7 | 2 k | 3300 | 1500 | 22 n | 47 n |
| 3.9 | 1.5 k | 4700 | 2200 | 22 n | 47 n |
| 4.1 | 1.1 k | 6800 | 3300 | 22 n | 47 n |
| 4.3 | 880 | 8200 | 3900 | 22 n | 47 n |

| Battery Voltage | Notch Frequency | R14, R24 | R34 | C14, C24 | C34 |
|---|---|---|---|---|---|
| 92% energy point | | | | | |
| 4.4 | 710 | 6800 | 3300 | 33 n | 68 n |
| 4.3 | 590 | 8200 | 3900 | 33 n | 68 n |
| 4.2 | 480 | 10000 | 4700 | 33 n | 68 n |
| 4.1 | 400 | 12000 | 5600 | 33 n | 68 n |
| 4.0 | 320 | 15000 | 6800 | 33 n | 68 n |

Note: The following equations apply to the active notch filter 416 components.

$$f_0 = \frac{1}{2\pi R_1 R_2} \pi \quad R_1 = R_2 = 2R_3 \quad C_1 = C_2 = \frac{C_3}{2}$$

When the A/D converter 32 converts the notches in the notched noise signal to a digital signal, it is possible that a notch could be read incorrectly. If an error of one increment is made in the determination of a notch frequency, the interpreted value within the A/D converter 32 will still fall near the correct value. Thus, the gauging error of the system remains small.

Figure 5A:
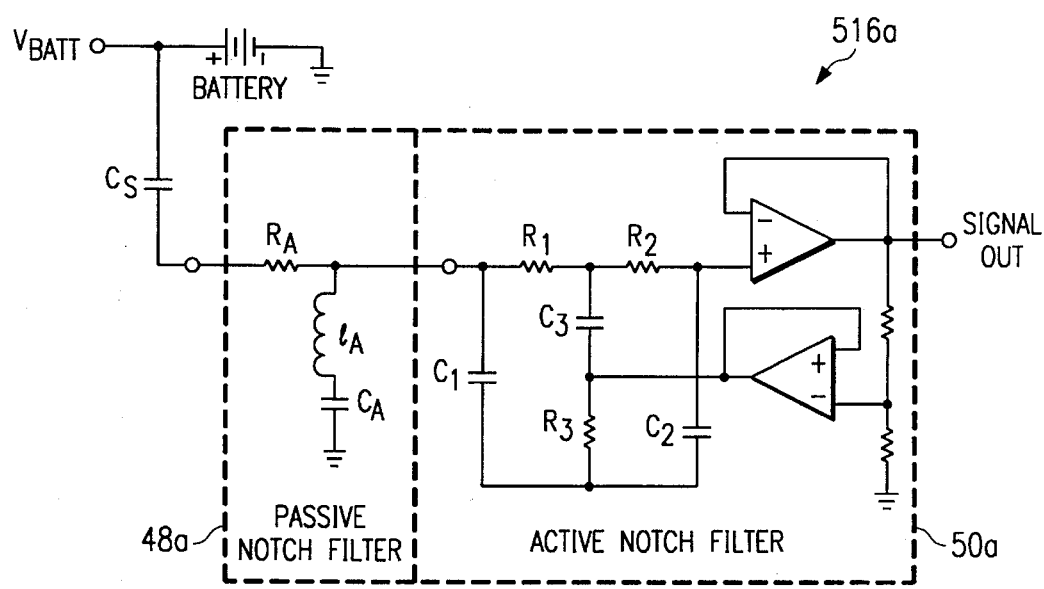
FIG. 5a is a circuit diagram of an exemplary combination active and passive notch filter cascade.

FIGS. 5a & 5b depict other exemplary notch filter circuits 516a 516b which could be used in an embodiment of the present invention. The depicted cascaded notch filters are partly active filters and partly passive notch filters. Thus, two notches are achieved with each set of op-amps. FIG. 5a has a passive notch filter 48a connected to an active notch filter 50a so that two notches are produced. The gain of the active notch filter portion 50a of the circuit can be increased to compensate for a decrease in signal strength through the passive filter portion 48a. FIG. 5b depicts a twin-T passive bandpass filter 48b in the feedback portion of an op-amp in the active notch filter design 50b thereby establishing a double notch, notch filter.

FIG. 6 is a flow chart depicting a preferred method of operation of a preferred exemplary embodiment of the present invention. First, a battery pack is attached to an electronic device S1. The battery pack contains a battery and a notch filter network. Then the electronic device is turned on S2. Immediately after turning on the device, the noise generator is turned on S3 and the output of the noise generator is directed to the notch filter network in the battery pack. Preferably, the frequency range of the white noise generator is from about 100 HZ to 70 KHZ. The notch filter network places frequency notches in the pass band of the white noise S5. The notches are set by notch filter stages wherein each stage includes resistors and capacitors connecting in a lattice structure. The filter stages can also have op-amps to aid the notch filtering process and to increase signal gain through the filter. The resistor and capacitor networks are preset by a manufacturer of the battery back to identify the battery type, configuration, chemical composition or other data relevant to the batteries installed in the battery pack. The resistors, capacitors and op-amps can be very small, inexpensive surface mount components.

The output of the notch filter exits the battery pack and is input into an A/D converter within the electronic device S5. The A/D converter, preferably, has a highest sampling rate of about 150 KHZ. Thus, the A/D converter can be a "slow" converter and be an inexpensive item to procure and install in the electronic apparatus.

The A/D converter converts the notches in the frequency band to digital signals. The digital signals are sent to a processor circuit which determines the type or chemical composition of the battery based on the digital information. The processor extracts information related to the battery from a look-up table 34 to determine the battery type and/or battery chemical composition S6.

Once the battery type is determined, the white noise generator and any active elements in the notch filter are turned off S7. Also, the A/D converter is turned off.

The processor can also receive battery voltage S8 and current usage S9 readings from other circuits in the electronic device. The processor can determine the amount of charge remaining in the battery based on the battery voltage S10 and a battery energy curve retrieved from the look-up table S11. The processor determines the amount of time remaining until the battery charge is below a useful amount of charge based on the remaining amount of charge in the battery and the present current load on the battery. The electronic apparatus displays the determined battery charge and/or remaining time available to a user of the electronic device 12.

The remaining time available display 36 is useful to a user of a portable electronic device, because in a battery powered electric drill or a portable video recorder user can determine how much longer the device will operate before the batteries need recharging or replacement. The method described in FIG. 6 can loop back to redetermine the battery voltage 58 and the current usage 59 of the electronic apparatus so that the display data is continuously updated. It is understood that energy can be saved by periodically rechecking the status of the battery voltage and current usage so that the battery management circuit is not continuously using power. One of ordinary skill in the art could oscillate the management system on-and-off periodically with a simple additional circuit (not shown).

Although a few preferred embodiments of the present invention have been described, it will be appreciated by those skilled in the art that changes may be made in these embodiments without departing from the principles and spirit of the invention, the scope of which is defined in the appended claims:

What is claimed is:

1. A system for determining a battery's energy capacity while the battery is in use in an electronic device, comprising:
   a battery pack;
   a first set of capacitors mounted in said battery pack comprising at least one capacitor;
   a first set of resistors mounting in said battery pack comprising at least one resistor;
   an op-amp circuit adapted to connect to said first set of capacitors and said first set of resistors so that a notch filter circuit results;
   a noise generator connected to said notch filter;
   an analog-to-digital converter connected to said notch filter for receiving a filtered signal and for producing a digital signal that corresponds to said filtered signal;
   a look-up table; and
   a processor circuit connected to said look-up table and to said analog to digital converter for determining the energy capacity of said battery.

2. The system of claim 1, wherein said op-amp circuit is positioned in said battery pack.

3. The system of claim 1, wherein said op-amp circuit is positioned in said electronic device.

4. The system of claim 1, wherein said processor circuit includes a microprocessor.

5. Circuitry associated with a battery pack for identifying characteristics of a battery within said battery pack, comprising:
   a first set of resistors comprising at least one resistor;
   a first set of capacitors comprising at least one capacitor, said first set of resistors and said first set of capacitors being organized into a circuit lattice, said circuit lattice being specifically for completing a notch filter circuit wherein an output of said notch filter circuit provides a battery information signal when electrical noise is input into said notch filter; said notch filter circuit is completed when said battery pack is connected to an electrical apparatus.

6. The circuitry of claim 5, further comprising an analog to digital converter for receiving said battery information signal and for outputting a digital signal associated with said battery information signal.

7. The circuitry of claim 6, further comprising:
   a look-up table;
   a battery voltage level detector circuit; and
   means for processing, connected to said look-up table, said output of said analog to digital converter and said battery voltage level detector circuit, for determining a remaining amount of battery energy.

8. The circuitry of claim 5, further comprising a noise generator for producing said electrical noise to be input into said notch filter.

9. The circuitry of claim 5, further comprising:
   a plurality of capacitors; and
   a plurality of resistors, said plurality of capacitors and resistors being organized into a plurality of individual circuit lattices wherein each of said plurality of circuit lattices completes a different notch filter circuit wherein the output of each said different notch filter circuit provides a portion of said battery information signal.

10. A battery type determination circuit comprising:
    a resistor and capacitor network within a battery pack;
    an op-amp circuit adapted to connect with said resistor and capacitor network thereby establishing a notch filter;
    a noise generator connected to an input of said noise generator; and
    means for determining a battery type based on an output of said notch filter.

11. The battery type determination circuit of claim 10, wherein said determining means comprises:
    an analog to digital converter connected to and output of said notch filter;
    a look-up table;
    a processor circuit connected to an output of said analog to digital converter and to said look-up table for determining a battery type.

12. The battery type determination circuit of claim 11, wherein said processor circuit is further for determining a chemical composition of said battery.

13. The battery type determination circuit of claim 11, wherein said processor circuit is further for determining said battery's energy capacity level.

14. The battery type determination circuit of claim 11, wherein said processor circuit is further for determining a time till said battery is discharged based on a battery's present usage level.

15. An electronic apparatus comprising:
    a removable battery pack comprising;
      a battery and at least a first portion of a notch filter circuit;
    a noise generator adapted to connect to said battery pack;
    an analog to digital converter which connects to said battery pack when said battery pack is connected to said noise generator; and
    a processor for receiving a signal from said analog to digital converter and thereby determining parameters associated with said battery in said battery pack.

16. The electronic device of claim 15, further comprising a second portion of said notch filter outside of said battery pack.

17. The electronic device of claim 15, further comprising a second portion of said notch filter within said battery pack.

18. The electronic device of claim 15, further comprising a battery charging circuit for charging said battery.

19. The electronic device of claim 15, wherein said first portion of said notch filter comprises surface-mount technology.

20. A method of determining a battery's status comprising the steps of:
    determining a battery voltage level;

determining a battery type based on an output of a notch filter associated with a battery;

looking-up a discharge curve for said battery type;

determining where on said discharge curve said determined voltage level is;

calculating the amount of time until the battery will be discharged below a predetermined voltage level based on a battery's present usage level.

21. The method of claim 20, further comprising a step of determining a present current usage and wherein said determined current usage is used in said calculating step.

22. The method of claim 20, wherein said notch filter comprises a resistor and capacitor network incorporated into a battery pack for said battery.

* * * * *